US008838616B2

(12) United States Patent
Matsumura

(10) Patent No.: US 8,838,616 B2
(45) Date of Patent: Sep. 16, 2014

(54) SERVER DEVICE FOR CREATING LIST OF GENERAL WORDS TO BE EXCLUDED FROM SEARCH RESULT

(75) Inventor: Norikazu Matsumura, Tokyo (JP)

(73) Assignee: NEC Biglobe, Ltd., Tokyo (JP)

( * ) Notice: Subject to any disclaimer, the term of this patent is extended or adjusted under 35 U.S.C. 154(b) by 862 days.

(21) Appl. No.: 12/543,263

(22) Filed: Aug. 18, 2009

(65) Prior Publication Data

US 2010/0057724 A1    Mar. 4, 2010

(30) Foreign Application Priority Data

Aug. 26, 2008   (JP) ................................ 2008-216465

(51) Int. Cl.
*G06F 17/30*    (2006.01)
(52) U.S. Cl.
CPC .... *G06F 17/30684* (2013.01); *G06F 17/30731* (2013.01)
USPC .......................................................... 707/749
(58) Field of Classification Search
CPC ..................... G06F 17/30684; G06F 17/30731
USPC .......................................................... 707/749
See application file for complete search history.

(56) References Cited

U.S. PATENT DOCUMENTS

| 7,587,389 B2 * | 9/2009 | Sugihara et al. ...................... 1/1 |
| 8,001,144 B2 * | 8/2011 | Novak .......................... 707/776 |
| 2008/0147646 A1 * | 6/2008 | Jaschek et al. .................... 707/5 |

FOREIGN PATENT DOCUMENTS

| JP | 57-125469 A | 8/1982 |
| JP | 11-259515 A | 9/1999 |
| JP | 2001325272 A | 11/2001 |
| JP | 2002117043 A | 4/2002 |
| JP | 2002140366 A | 5/2002 |
| JP | 2004054882 A | 2/2004 |
| JP | 2004139222 A | 5/2004 |
| JP | 2005135113 A | 5/2005 |
| JP | 2006146802 A | 6/2006 |
| WO | 2005066837 A | 7/2005 |

OTHER PUBLICATIONS

Japanese Office Action for JP2008-216465 dated May 19, 2010.
M Okamoto et al., "HOTWORDLINK for Topical Word Extraction and Related Information Retrieval", Toshiba Review, vol. 62, No. 12, Dec. 1, 2007; pp. 58-61.

* cited by examiner

*Primary Examiner* — Sheree Brown
(74) *Attorney, Agent, or Firm* — Sughrue Mion, PLLC

(57) ABSTRACT

A server device of the present invention includes a control unit collecting texts stored in a storage unit in response to an instruction from the outside or when a predetermined time is reached, extracting words from the collected texts, determining, as a general word, a word which appears at a frequency higher than a first predefined value for a first predetermined period, and which appears at a frequency that varies within a second predefined value range for every second predetermined period that is shorter than the first predetermined period, and creating a general word list which enumerates the general words.

16 Claims, 8 Drawing Sheets

Fig.3

| word A | words C | add to search words | not required for search |
|---|---|---|---|
| XYZ | ghi( ), jkl( ), ··· | ☐ | ☐ |
| UVW | mno( ), pqr( ), ··· | ☐ | ☐ |
| ⋮ | ⋮ | ⋮ | ⋮ |

Fig.4

Please enter one or more search words in the box below.

express
Ekusupuresu
EKUSUPURESU back    next

Fig.5

Title: new product information
Contents: "... NEC has announced a new product of Express 5800 sever on X day, X month. This product features that PC ..."

Fig.6

| | | | | required | negate |
|---|---|---|---|---|---|
| Express 5800 | NEC(100) | server(85) | PC(50) | O | |
| Tsukuba Express | electric train (85) | Akihabara (65) | TSUKUBA (30) | | O |
| Express reservation | Shinkansen (60) | super-express (40) | electric train (40) | | O |
| ··· | | | | | |

Fig.7

```
<search formula>
(express OR Exusupuresu OR EKUSUPURESU OR Express 5800) NOT
(Tsukuba Express OR express reservation)

<pertinent words>
  NEC   server   PC   ...

[back] [decide]
```

Fig.8

```
<a view of blogs>

Title: new product information
Contents: "... NEC has announced a new product of Express 5800 sever
         on X day, X month. This product features that PC ..."

Title: ...
Contents: ...

```
Please enter one or more prohibitive words in the right box below.

express
Ekusupuresu          NOT      [    ]
EKUSUPURESU

[back] [next]
```

Fig.10

| word A | words C | | | required | negate |
|---|---|---|---|---|---|
| Express 5800 | NEC(100) | server(85) | PC(50) | O | |
| Tsukuba Express | electric train (85) | Akihabara (65) | TSUKUBA (30) | | O |
| Express reservation | Shinkansen (60) | super-express (40) | electric train (40) | | O |
| ... | ... | ... | ... | | |

| word B | words D | | | required | negate |
|---|---|---|---|---|---|
| NEC | ... | ... | ... | O | |
| server | ... | ... | ... | O | |
| electric train | ... | ... | ... | | O |
| ... | ... | ... | ... | | | daily aggregate

| rank | 2008/1/1 | | | | 2008/1/2 | | | | ... |
|---|---|---|---|---|---|---|---|---|---|
| | | number | probability | ranking point | | number | probability | ranking point | |
| 1 | word a | 500 | 500/52000 | 5000 | word g | 600 | 600/56000 | 5000 | |
| 2 | word b | 480 | 480/52000 | 4999 | word a | 520 | 520/56000 | 4999 | |
| 3 | word c | 465 | 465/52000 | 4998 | word c | 490 | 490/56000 | 4998 | |
| 4 | word d | 450 | 450/52000 | 4997 | word i | 460 | 460/56000 | 4997 | |
| 5 | word e | 445 | 445/52000 | 4996 | word h | 440 | 440/56000 | 4996 | |
| 6 | word f | 440 | 440/52000 | 4995 | word f | 425 | 425/56000 | 4995 | |
| : | : | : | : | : | : | : | : | : | |
| total | | 52000 | 52000/52000 | | | 56000 | 56000/56000 | | |

Fig.14 total aggregate (period: 2008/1/1~200X.X.X)

|  | total number | rank of total number | rank of daily probability | total of ranking points |
|---|---|---|---|---|
| word a | 4200 | 1 | 0.075 | 34986 |
| word b | 2200 | 9 | 0.04 | 25179 |
| word c | 3600 | 2 | 0.064 | 34972 |
| word d | 2500 | 4 | 0.045 | 28462 |
| word e | 2000 | 12 | 0.036 | 22879 |
| word f | 1700 | 20 | 0.03 | 18068 |
| ⋮ | ⋮ | ⋮ | ⋮ | ⋮ |

SERVER DEVICE FOR CREATING LIST OF GENERAL WORDS TO BE EXCLUDED FROM SEARCH RESULT

This application is based upon and claims the benefit of priority from Japanese Patent Application No. 2008-216465 filed on Aug. 26, 2008, the content of which is incorporated by reference.

BACKGROUND OF THE INVENTION

1. Field of the Invention

The present invention relates to a server device, an information processing method, and a program for causing a computer to execute the method.

2. Description of Related Art

Generally, information which has become a current topic is taken up in many web pages and blogs. When words frequently used in web pages and blogs are ranked by the number of times they have been used, current information of interest can be collected. However, in such search results, general words will simply be ranked higher. General words refer to those words which are used generally in sentences, for example, words associated with 'time', 'blog', 'diary' and the like. For ranking words with exclusion of these general words, JP-57-125469A (hereinafter called "Patent Document 1") discloses an example of a method which employs a general word list.

Since the general word list is manually created by a user, the creation of the list involves problems as to the number of required work steps and the completeness of listed words, and is therefore difficult. It is also difficult for a person to imagine general words for creating a general word list.

While Patent Document 1 discloses the unnecessary word file NFL for storing character strings which need not be extracted, Patent Document 1 does not describe how this file is created. When this file is created by a person, a problem arises in that the user is heavily burdened with the work. In many cases, since users neglect such a setting of non-display conditions, they may often fail to find really necessary, true information or they may pass over such information.

SUMMARY

An exemplary object of the invention is to provide a server device, an information processing method, and a program for causing a computer to execute the method, for creating a list of unnecessary general words, which should be excluded from search results, instead of creating the list by users.

A server device according to an exemplary aspect of the invention includes a control unit collecting texts stored in a storage unit in response to an instruction from the outside or when a predetermined time is reached, extracting words from the collected texts, determining, as a general word, a word which appears at a frequency higher than a first predefined value for a first predetermined period, and which appears at a frequency varying within a second predefined value range for every second predetermined period shorter than the first predetermined period, and creating a general word list which enumerates the general words.

According to the present invention, since unnecessary words are excluded from extraction/collection results by the use of a general word list, when information is to be extracted/collected, even if the user has not previously created the general word list, the readability for the result of analyses on extracted/collected words is improved.

The above and other objects, features and advantages of the present invention will become apparent from the following description with reference to the accompanying drawings which illustrate examples of the present invention.

BRIEF DESCRIPTION OF THE DRAWINGS

FIG. 3 is a diagram showing an exemplary search word confirmation screen in the first exemplary embodiment;

FIG. 4 is a diagram showing an exemplary keyword entry screen for a search;

FIG. 5 is a diagram showing an example of a search-hit blog;

FIG. 6 is a diagram showing an exemplary search word confirmation screen in Example 1;

FIG. 7 is a diagram showing an exemplary related-word screen;

FIG. 8 is a diagram showing an exemplary screen which displays blogs resulting from a search;

FIG. 9 is a diagram showing an exemplary keyword entry screen in a second exemplary embodiment;

FIG. 10 is a diagram showing an exemplary search word confirmation screen in the second exemplary embodiment;

FIG. 14 is a table showing an exemplary total aggregate for a certain period.

DETAILED DESCRIPTION OF THE EXEMPLARY EMBODIMENTS

First Exemplary Embodiment

In this exemplary embodiment, a description will be given of an information search method which is the basis for creating of a general word list. First described is a configuration for implementing the information search method according to this exemplary embodiment.

Figure 1:
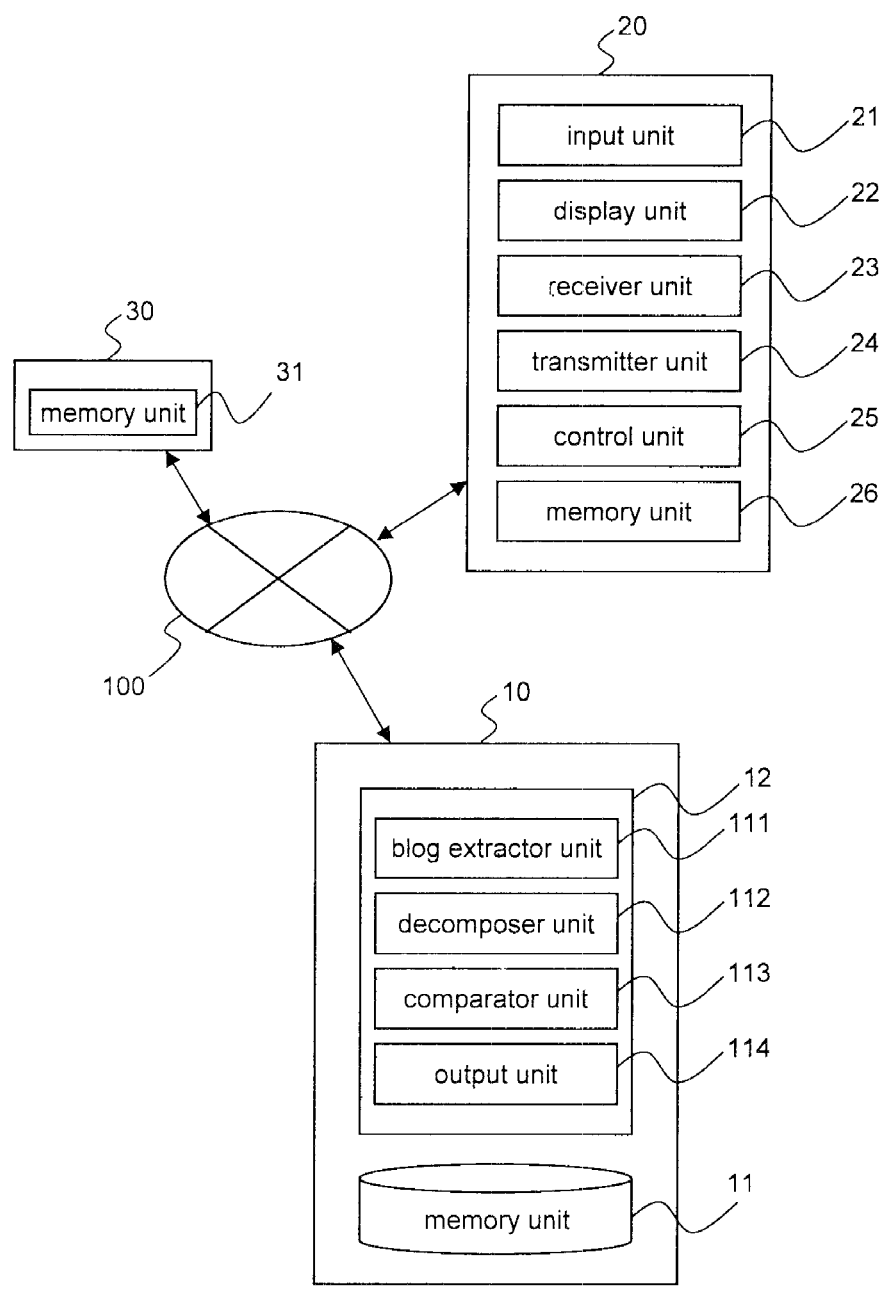
FIG. 1 is a block diagram for describing an information search method according to a first exemplary embodiment.

FIG. 1 is a block diagram for describing the information search method according to this exemplary embodiment. As shown in FIG. 1, search server 10 and information processing device (hereinafter called as IPD) 20 are connected through network 100. Search server 10 is an information search device, while IPD 20 is a terminal used by a user to search for information. Blog server 30 is connected to network 100. Blog server 30 comprises memory unit 31 for storing information which can be subjected to searches, and is available for browsing on the network. This memory unit 31 is an exemplary storage unit of the present invention.

Search server 10 comprises memory unit 11 and control unit 12. Memory unit 11 has a language analysis engine previously recorded thereon, which is application software for extracting words from texts. The language analysis engine analyzes a described sentence (text), and decomposes the sentence into words with part of speech. Control unit 12 comprises a CPU (Central Processing Unit) (not shown) for executing predetermined processing in accordance with a program, and a memory (not shown) for storing the program.

Control unit 12 comprises blog extractor unit 111, decomposer unit 112, comparator unit 113, and output unit 114. The CPU executes a program to virtually implement blog extractor unit 111, decomposer unit 112, comparator unit 113, and output unit 114 within search server 10. Details of operations in each component will be described in the procedures of the information search method.

IPD 20 comprises input unit 21 for the user to enter an instruction; display unit 22 for displaying the result of a search under way; receiver unit 23 for receiving data from search server 10 through the network; transmitter unit 24 for transmitting data to search server 10 through the network; control unit 25 for controlling each component; and memory unit 26 for storing information which is transmitted/received to/from the outside. Memory unit 26 has previously registered therein a browser which is application software for displaying a screen for a search.

Servers and information processing devices connected to network 100 have been previously assigned different identifiers on a device-by-device basis, and data communicated between search server 10 and IPD 20 is appended with respective identifiers indicative of a data destination device and a data source device.

Next, a description will be given of the information search method by search server 10 according to this exemplary embodiment.

Figure 2:
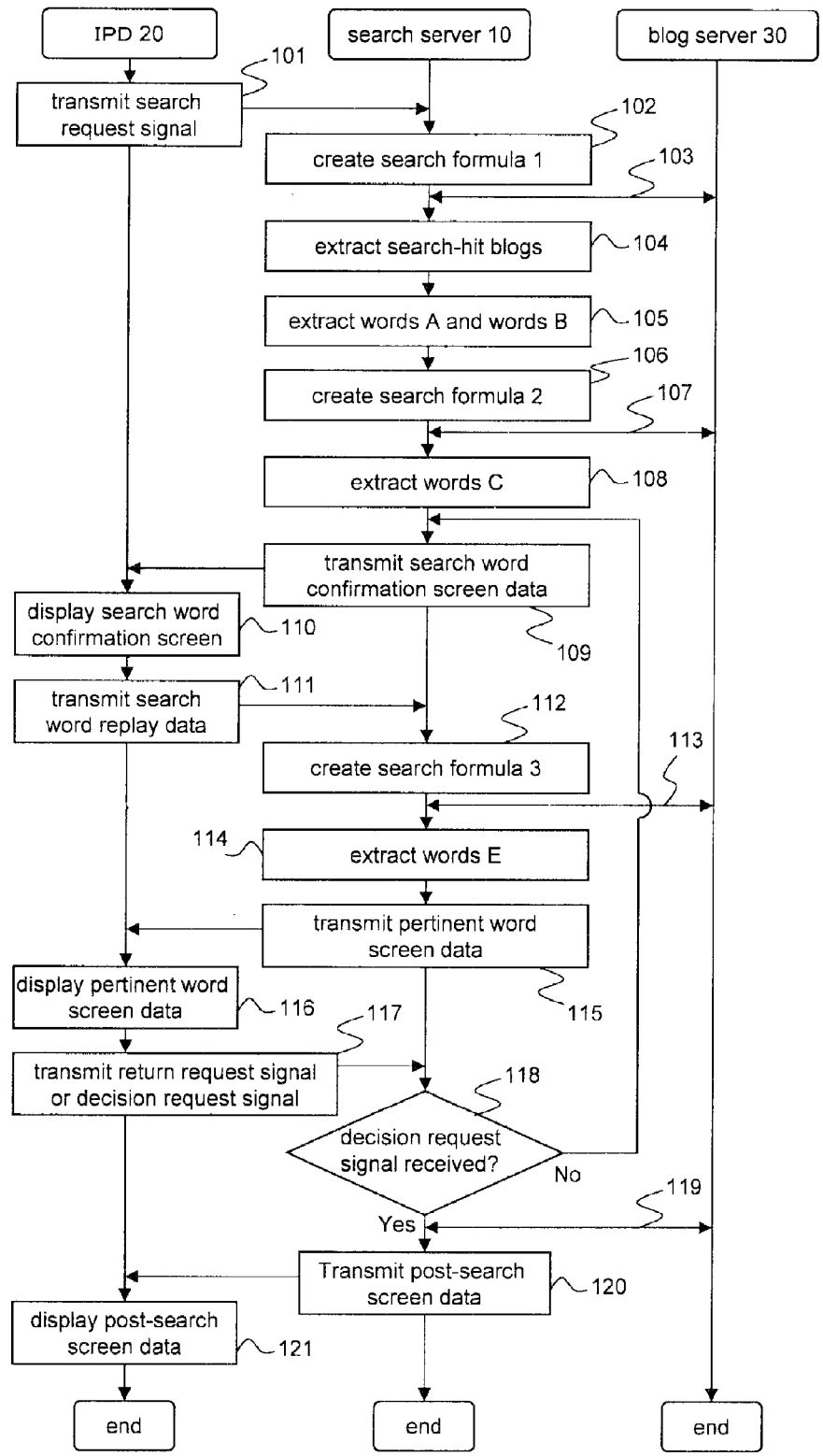
FIG. 2 is a sequence diagram showing an exemplary information search method according to the first exemplary embodiment.

FIG. 2 is a sequential diagram showing an example of the information search method according to this exemplary embodiment.

As the user manipulates input unit 21 of IPD 20 to enter a keyword, control unit 25 transmits a search request signal including information on the keyword to search server 10 through transmitter unit 24 (step 101).

When search server 10 receives the search request signal from IPD 20 through network 100, blog extractor unit 111 reads the keyword from the search request signal, creates search formula 1 from the keyword (step 102), searches blogs subjected to a search, stored in blog server 30 on network 100, for those blogs which include the keyword (step 103), and extracts blogs which include the keyword (step 104). In the following, a blog which includes a keyword is called the "search-hit blog."

Decomposer unit 112 decomposes sentences such as the titles, contents and the like of the search-hit blogs extracted by blog extractor unit 111 into parts of speech, extracts nouns from the decomposed parts of speech, and counts the number of times each of the extracted nouns is used. This processing is executed for all the search-hit blogs. This processing is performed by executing the language analysis engine registered in memory unit 11.

Comparator 13 compares the nouns extracted by decomposer unit 112 with the keyword, designates a noun which partially matches the keyword as word A, stores word A associated with the keyword together with a use count in memory unit 11 (step 105). Word A does not include a noun which completely matches the keyword or a noun which does not match the keyword. From the fact that word A is a word approximate to the keyword from the viewpoint of notation, word A is called the "notation wobbling word."

Comparator 113 also designates a noun which does not even partially match, when it is compared with the keyword, as word B, and stores word B associated with the keyword in memory unit 11 (step 105). From the fact that word B is pertinent to the keyword, though it does not even partially match, word B is called the "pertinent word."

Next, search server 10 executes the following operations for extracting word C which is a pertinent word for word A. Word C is equivalent to a "pertinent word of word A."

Blog extractor unit 111 reads word A which is used a number of times more than a certain predefined number or which is ranked at a position higher than a certain predefined level from memory unit 11, creates search formula 2 from search formula 1 and word A (step 106), and searches search-hit blogs (or blogs subjected to a search) with word A stored in memory unit 11 for blogs including word A, the blogs including word A are extracted (step 107). Decomposer unit 112 decomposes sentences such as the titles, contents and the like of the search-hit blogs including word A and extracted by blog extractor unit 111 into parts of speech, extracts nouns from decomposed parts of speech (while verbs or adjectives may be included other than nouns, the nouns alone are designated here for simplifying the description), and counts the quantity of the extracted nouns. Comparator unit 113 compares the extracted nouns with the keyword or word A, and stores nouns which do not match the keyword or word A, in association with word A, in memory unit 11 as word C (step 108).

Output unit 114 reads from memory unit 11 word A and word C associated with word A, which is used a number of times more than a certain predefined number or ranked at a position higher than a certain predefined level, and adds an additional require/negate column for entering whether or not word A should be added to search words to produce search word confirmation screen data which is then transmitted to IPD 20 (step 109).

FIG. 3 is a diagram showing an exemplary search word confirmation screen in this exemplary embodiment. As shown in FIG. 3, the screen displays, side by side, word A, words C associated with each word A, and an entry column for requiring/negating the addition as to whether or not word A should be added to search words (hereinafter called the "additional require/negate column"). The additional require/negate column includes two columns which are "add to search words" which is applicable when word A should be added to the search words, and "not required for search" which is applicable when word A should be excluded from the search words.

The second row of the table shown in FIG. 3 displays word A "XYZ"; word C "ghi( ), jkl( ), . . . "; and the additional require/negate column in order from the left. The third row of the table displays word A "UVW"; word C "mno( ), pqr( ), . . . "; and the additional require/negate column from the left, in a manner similar to the second row. While omitted in FIG. 3, the number of times word C is used in blogs is displayed within the parenthesis of this word C. The additional require/negate column is marked with a check or a circle.

When receiver unit 23 of IPD 20 receives search word confirmation screen data through search server 10, control unit 25 causes display unit 22 to display a search word confirmation screen based on the search word confirmation screen data (step 110).

The user views the search word confirmation screen, and manipulates input unit 21 to mark a check on "add to search word" in the additional require/negate column on that row if there is a word which the user wishes to add to search words, among listed words A. On the contrary, if there is a word which the user wishes to exclude from the search words, the user manipulates input unit 21 to mark a check on "not required for search" of the additional require/negate column on that row. If there are a plurality of words which the user wishes to add to or exclude from the search words, the user may mark a plurality of checks.

After the user has entered the instruction to add or exclude specified word A to or from the search words, while manipulating input unit 21, and after the user has entered a transmission instruction, IPD 20 allows for the contents of the instruction from the user, prepares search word replay data by adding a flag which indicates that specified word A is added to the search words or a flag which indicates that word A is not added to the search words, and transmits the search word reply data to search server 10 through transmitter unit 24.

Upon receipt of the search word reply data from IPD 20, blog extractor unit 111 of search server 10 creates a search formula (search formula 3) based on information in the search word reply data, by adding word A to OR if this word A is appended with a flag which indicates that word A should be added to the search words, and by adding word A to NOT if word A is appended with a flag which indicates that word A should not be added to the search words (step 112). Then, blog extractor unit 111 searches search-hit blogs (or blogs subjected to the search) with search formula 3 (step 113) to extract appropriate blogs. The search formula is stored in memory unit 11 in association with the keyword.

Decomposer unit 112 decomposes sentences such as the titles, contents and the like of the blogs extracted by blog extractor unit 111 into parts of speech, extracts nouns from the decomposed parts of speech, and counts the quantity of the extracted nouns.

Comparator unit 113 compares the extracted nouns with the keyword and added word A, designates a noun which does not even partially match the keyword as word E (post-search pertinent word), and stores word E associated with the keyword in memory unit 11 (step 114). Output unit 114 transmits pertinent word screen data including word E and the number of times it is used to IPD 20 (step 115).

When receiver unit 23 of IPD 20 receives the pertinent word screen data from search server 10, control unit 25 causes display unit 22 to display a pertinent word screen with a font size proportional to the number of times word E is used based on the pertinent word screen data (step 116).

The user manipulates input unit 21 to enter an instruction to return to the search word confirmation screen for again making another search when the user determines that the pertinent word screen, viewed by him, includes a word which is not pertinent to a search object. When the instruction is entered to return to the search word confirmation screen, control unit 25 transmits a return request signal to search server 10 for requesting the same to return to the search word confirmation screen (step 117). When the signal received from IPD 20 is determined to be the return request signal (step 118), search server 10 returns to step 109, where output unit 114 transmits the search word confirmation screen data to IPD 20.

On the other hand, when the user, viewing the pertinent word screen, determines that only words pertinent to the search object are displayed on the screen, the user manipulates input unit 21 to enter an instruction to execute a search in order to instruct the execution of the search formula. Upon entry of the search execution instruction, control unit 25 transmits a decision request signal to search server 10 for requesting search server 10 to decide the search formula (step 117). When search server 10 determines that the signal received from IPD 20 is the decision request signal (step 118), search server 10 executes the search formula created at step 112 to extract blogs of interest (step 119), and transmits post-search screen data, including sentences of the retrieved blogs, to IPD 20 (step 120). Upon receipt of the post-search screen data from search server 10, IPD 20 displays a post-search screen (step 121).

Example 1

A description will be given of a scenario where a search is made for articles on a server "EXPRESS 5800" made by NEC. In this regard, the following steps are the same as those shown in the flow chart of FIG. 2.

FIG. 4 is a diagram showing an exemplary screen for entering a keyword for a search. When the user manipulates input unit 21 of IPD 20 to enter an instruction to request a search, the search initial screen shown in FIG. 4 is displayed on display unit 22. Here, the keyword enter screen is assumed to be included in an initial screen of a browser registered in memory unit 26 of IPD 20, but instead, initial screen may be acquired from search server 10.

The user manipulates input unit 21 to enter three words into a keyword input field shown in FIG. 4, i.e., "express," "EKUSUPURESU" in katakana, and "EKUSUPURESU" in hiragana. In the following, "EKUSUPURESU" in katakana notation is represented by "Ekusupuresu," while "EKUSU-PURESU in hiragana notation is represented by "EKUSU-PURESU." One English word is entered as a keyword in various notations for the following reason. In Japanese, even a word of the same pronunciation is represented in three notation ways, i.e., Chinese characters, hiragana, and katanaka, and when an English word is written in Japanese notation, hiragana or katakana may be used in some cases. Subsequently, when the user selects "NEXT" button shown in FIG. 4, IPD 20 transmits a search request signal including the three keywords to search server 10 (step 101).

Upon receipt of the search request signal from IPD 20, search server 10 reads the keywords from the search request signal, and creates the following search formula 1 for extracting blogs of interest (step 102).

express OR Ekusupuresu OR EKUSUPURESU   Formula 1

Search server 10 extracts search-hit blogs from blogs open to the public on network 100 according to Formula 1.

FIG. 5 is a diagram showing an example of a search-hit blog. The search-hit blog shown in FIG. 5 is an article on news published on the network by NEC. The contents described in the article state, " . . . NEC has announced a new product of Express 5800 server on x day, x month. This product features that PC . . . " Search server 10 decomposes sentences of the title, contents and the like of this search-hit blog into parts of speech. When search server 10 decomposes the titles and contents respectively, this processing results in "new product/ information" for the title, and " . . . /NEC/has/announced/a/ new product/of/Express 5800/server/on/x day/x month/. /This/product/features/that/PC/ . . . " for the contents.

Subsequently, search server 10 extracts nouns from the decomposed parts of speech. Extracted nouns are "new product, information, NEC, Express 5800, server, PC, . . . " Further, for each of the nouns decomposed as described above, the search server 10 counts the number of times it is used in the search-hit blog shown in FIG. 5. The result is "new product (2), information (1), NEC (1), Express 5800 (1), PC (1), . . . " where the number of times each noun is used is shown in parenthesis.

Search server 10 counts the number of times each noun is used for all search-hit blogs extracted according to search formula 1. The result is "Express 5800 (100), NEC (100), Tsukuba Express (90), server (85), electric train (85), Akihabara (65), Express reservation (60), Shinkansen (60), PC (50), super-express (40), electric train (85), TSUKUBA (30), . . . "
It should be noted that "Tsukuba Express" and "Shinkansen" (bullet train) are registered trademarks.

Search server 10 compares the extracted nouns with the keywords, and designates those nouns which partially match the keyword as words A. Words A are "Express 5800 (100), Tsukuba Express (90), Express reservation (60), . . . " Here, for simplifying the description, the three most frequently used words are designated as words A.

On the other hand, since words B result from exclusion of words A from the nouns extracted in the aforementioned manner, they are "NEC (100), server (85), electric train (85), Akihabara (65), Shinkansen (60), PC (50), super-express (40), electric train (40), TSUKUBA (30), . . . "

At step 106, search server 10 takes AND of search formula 1 and words A to create the following three search formulae 2:

(Formula 1) AND Express 500    (Formula 2-1)

(Formula 1) AND Tsukuba Express    (Formula 2-2)

(Formula 1) AND Express reservation    (Formula 2-3)

Search server 10 extracts nouns and counts the number of times each noun is used for all search-hit blogs extracted according to Formula 2-1, in a manner similar to that when words A were found. As a result, the nouns are "NEC (100), server (85), PC (50), . . . " when they are listed from the most frequently used ones. They are words C which are pertinent words as regards "Express 5800" (step 108). Similarly, from all search-hit blogs extracted according to Formula 2-2, words C, which are pertinent words as regards "Tsukuba Express," are found as "electric train (85), Akihabara (65), TSUKUBA (30), . . . " From all search-hit blogs extracted according to Formula 2-3, words C, which are pertinent words as regards "express reservation," are found as "Shinkansen (60), super-express (40), electric train (40), . . . "

At step 109, search server 10 transmits search word confirmation screen data to IPD 20. The search word confirmation screen data includes words A, words C which are ranked at positions higher than a certain predefined level, and an additional require/negate column for specifying whether or not each word A should be added to the search words.

FIG. 6 is a diagram showing an exemplary search word confirmation screen displayed on IPD 20.

The first column of the table shown in FIG. 6 describes words A "Express 5800," "Tsukuba Express," and "express reservation" in order from above. The second column describes words C corresponding to each word A. Here, the most frequently used three words are listed as words C. For example, three words C, i.e., "NEC," "server," and "PC" are listed for word A "Express 5800" on the first row.

Each row is further provided with the additional require/negate column on the third and fourth columns. The third column is a column for addition "required" which is marked when the user wishes to add word A to the search words, while the fourth column is a column for addition "negated" which is marked when the user wishes to exclude word A from the search words on the contrary. The user places a mark on the addition "require" column when he wishes to add word A to the search words, and places a mark on the addition "negate" column when he wishes to exclude word A from the search words on the contrary. The user may determine whether or not word A should be added to the search words with reference to words C.

In the example shown in FIG. 6, "Express 5800" is marked with a circle on the addition "require" column, while "Tsukuba Express" and "express reservation" are marked with a circle on the addition "negate" column.

Upon receipt of search word replay data which includes the additional require/negate information as shown in FIG. 6 added to the search word confirmation screen from IPD 20, search server 10 adds word A "Express 5800," which is to be added to the search words, to OR in search formula 1, and adds words A "Tsukuba Express" and "express reservation," which are not added to the search words, to NOT of the search formula to create the following search formula 3 which reflects the additional require/negate information (step 112).

(express OR Ekusupuresu OR EKUSUPURESU OR Express 5800) NOT (Tsukuba Express OR express reservation)    Formula 3

Search server 10 extracts nouns from all search-hit blogs extracted according to formula 3, and counts the number of times each noun is used in a manner similar to that when words A were found. As a result, the nouns are "NEC (100), server (85), PC (50), . . . " when they are listed from the most frequently used ones. They are words E which are pertinent words as regards "Express 5800" after the search (step 114).

At step 115, search server 10 transmits pertinent word screen data to IPD 20. The pertinent word screen data includes words E, the number of times each word E is used, and information on search formula 3. Upon receipt of the pertinent word screen data from search server 10, IPD 20 displays words E on a pertinent word screen with a font size proportional to the number of times word E is used, based on the pertinent word screen data (step 116). Search server 10 also displays search formula 3 on the pertinent word screen.

FIG. 7 is a diagram showing an exemplary pertinent word screen.

As shown in FIG. 7, search formula 3 is displayed in an upper region of the screen. Two buttons are displayed in a lower region of the screen. One button is "BACK," and the other button is "DECIDE." Words E are displayed in the middle of the screen as pertinent words. "NEC" is displayed in the largest font size; "server" in the second largest font size; and "PC" in a font size smaller than that of "server." This is because the font size corresponds to the number of times each word is used. A more frequently used word is displayed in a larger font size, while a less frequently used word is displayed in a smaller font size.

By thus displaying a more pertinent word in a larger font size, the user can determine whether or not the search is being more correctly carried out.

When the user manipulates input unit 21 of IPD 20 to select "DECIDE" on the pertinent word screen of FIG. 7, IPD 20 transmits a decision signal to search server 10. Upon receipt of the decision signal from IPD 20, search server 10 acquires information on blogs of interest through network 100, and transmits blog screen data including the information on the blogs to IPD 20. FIG. 8 is a diagram showing an exemplary screen which displays blogs resulting from the search. As shown in FIG. 8, the retrieved blogs are displayed in order.

On the other hand, pertinent words shown in the screen of FIG. 7 include impertinent words, so that if the user manipulates input unit 21 of IPD 20 to select "BACK," the method returns to step 112, where the user can add words which he wishes to exclude to the NOT condition.

It is understood that in the search method described above, the user may perform simple actions as follows:

Action 1: enter a keyword for a search object.

Action 2: select whether each displayed word A (notation wobbling word) is pertinent/impertinent with reference to words C simultaneously displayed therewith.

Action 3: determine whether displayed words E (post-search pertinent words) relate to what the user wishes to search.

Action 4: If words E include impertinent words, re-do Action 2. When the displayed words are all pertinent, terminate editing of the search formula, and execute a search using the edited search formula.

Also, search server 10 extracts words A, B, C in respective methods summarized below:
(Method of Extracting Words A)

(i) Extract texts according to an entered search condition.

(ii) Extract words one by one from the texts using a language analysis engine.

(iii) Enumerate nouns out of the words in order from the most frequently appearing word (most frequent word).

(iv) Examine whether or not each word hits the entered search condition by matching. Erase a word if it completely matches the search condition, and display a word as word A if it partially matches the search condition. Words A correspond to first words in the present invention.

For example, "express" is erased because it completely matches the search formula. On the other hand, "Express 5800" is displayed as word A because it partially matches the search formula.
(Method of Extracting Words B)

After performing steps (i)-(iii) for words A in a similar manner, search server 10 examines whether or not each word hits the entered search condition by matching. If a word does not match the search condition, it is displayed as word B. Words B correspond to third words in the present invention.
(Method of Extracting Words C)

(i) Extract text blogs according to [entered search condition AND words A]

(ii) perform steps (ii) and (iii) according to the method for extracting words A in a similar manner. Words C correspond to second words in the present invention.

According to this example, since candidate words are displayed to give a hint for creating a search formula, the user can reduce the number of steps for creating a search formula and is less burdened. The user can execute a more accurate search, even without special knowledge about the search, by repeating interactions with the search server.

In this regard, all created search formulae may be preserved in memory unit 11 such that when another user is performing a similar search, search server 10 may present the search formulae preserved in memory unit 11 to the user as a recommendation. The use of a search formula created in the past not only reduces the burden on the user but also reduces the burden of calculation processing on search server 10.

Second Exemplary Embodiment

This exemplary embodiment allows the user to enter a more detailed search condition, as compared with the first exemplary embodiment, so that the user can more efficiently collect blogs that are subject to a search.

The user makes actions in the following manner in a search method according to this exemplary embodiment.

Action 1: enter a keyword for a search object (AND, OR conditions), and set prohibitive words (NOT condition). FIG. 9 is a diagram showing an exemplary keyword enter screen in this exemplary embodiment. In the screen shown in FIG. 9, a prohibitive word entry field is added to the screen shown in FIG. 4.

Action 2: select whether each of displayed word A (notation wobbling words) and words B (pertinent words) is pertinent or impertinent to the search object.

Action 3: Update data, calculate and again display words A and words B.

Action 4: If it seems that there are too many impertinent words, return to Action 1 to delete a causal word from the condition formula. If the search result can be modified, return to and re-do Action 2. When displayed words are all pertinent, terminate the editing of the search formula, and execute a search using the edited search formula.

A description will be given of operations of search server 10 involved in the foregoing actions.

After finding words B at step 105 of the sequence diagram shown in FIG. 2, search server 10 extracts words D, which are pertinent words to words B, at step 108 in the following manner.

Blog extractor unit 111 creates search formula 4 from search formula 1 and words B, searches search-hit blogs for words B stored in memory unit 11 to extract blogs which include words B. Taking Example 1 as an example, search formula 4 is:

(Formula 1) AND NEC        Formula 4

Decomposer unit 112 decomposes sentences such as tiles, contents and the like of search-hit blogs which include word B, extracted by blog extractor unit 111 into parts of speech, extracts nouns from the decomposed parts of speech (while verbs or adjectives may be included other than nouns, nouns alone are designated here for simplifying the description), and counts the quantity of nouns. Comparator unit 113 compares the extracted nouns with the keyword or word B, designates nouns which do not match the keyword or word B as words D, and stores words D in memory unit 11 in association with word B. Words D are "server (85), PC (50), . . . " as pertinent words to "NEC" which is word B in formula 4.

When search server 10 has extracted words D in the foregoing manner, output unit 114 reads from memory unit 11, the table shown in FIG. 6, word B, and words D which are associated with word B and are used a number of times more than a certain predefined number or ranked at a position higher than a certain predefined level. Output unit 114 adds information on a table which additionally includes an additional require/negate column for entering whether or not word B should be added to the search words, to search word confirmation screen data, and output unit 114 transmits the search word confirmation data to IPD 20 (step 109).

FIG. 10 is a diagram showing an exemplary search word confirmation screen in this exemplary embodiment. The screen shown in FIG. 10 displays two tables, where the upper table is similar to that of FIG. 6, and the lower table provides word B as well as word D and an additional require/negate column corresponding to word B.

The user can obtain words B and information on words D which are pertinent words to words B, in addition to information related to words A and words C from the search word confirmation screen shown in FIG. 10. Then, the user can also return information as to whether or not words B should be added to the search words to search server 10.

In this exemplary embodiment, the search efficiency can be improved by increasing the amount of information on the search condition and by reducing the number of times interactions are performed between IPD 20 and search server 10.

Specifically, search server 10 extracts words D in a method summarized below:
(Method of Extracting Words D)

(i) Extract text blogs according to [entered search condition AND words B].

(ii) Perform steps (ii) and (iii) according to the method for extracting words A in the first exemplary embodiment in a similar manner. Words D correspond to fourth words in the present invention.

Third Exemplary Embodiment

This exemplary embodiment is intended to prevent general words from being introduced into words C extracted in the first exemplary embodiment, and into words B and words D extracted in the second exemplary embodiment at higher ranks. The general words refer to those words which are generally used in sentences. For example, the general words may include words such as time, blog, diary and the like.

This exemplary embodiment will be described in connection with batch processing intended for those blogs which have been announced or updated for a certain period.

Figure 11:
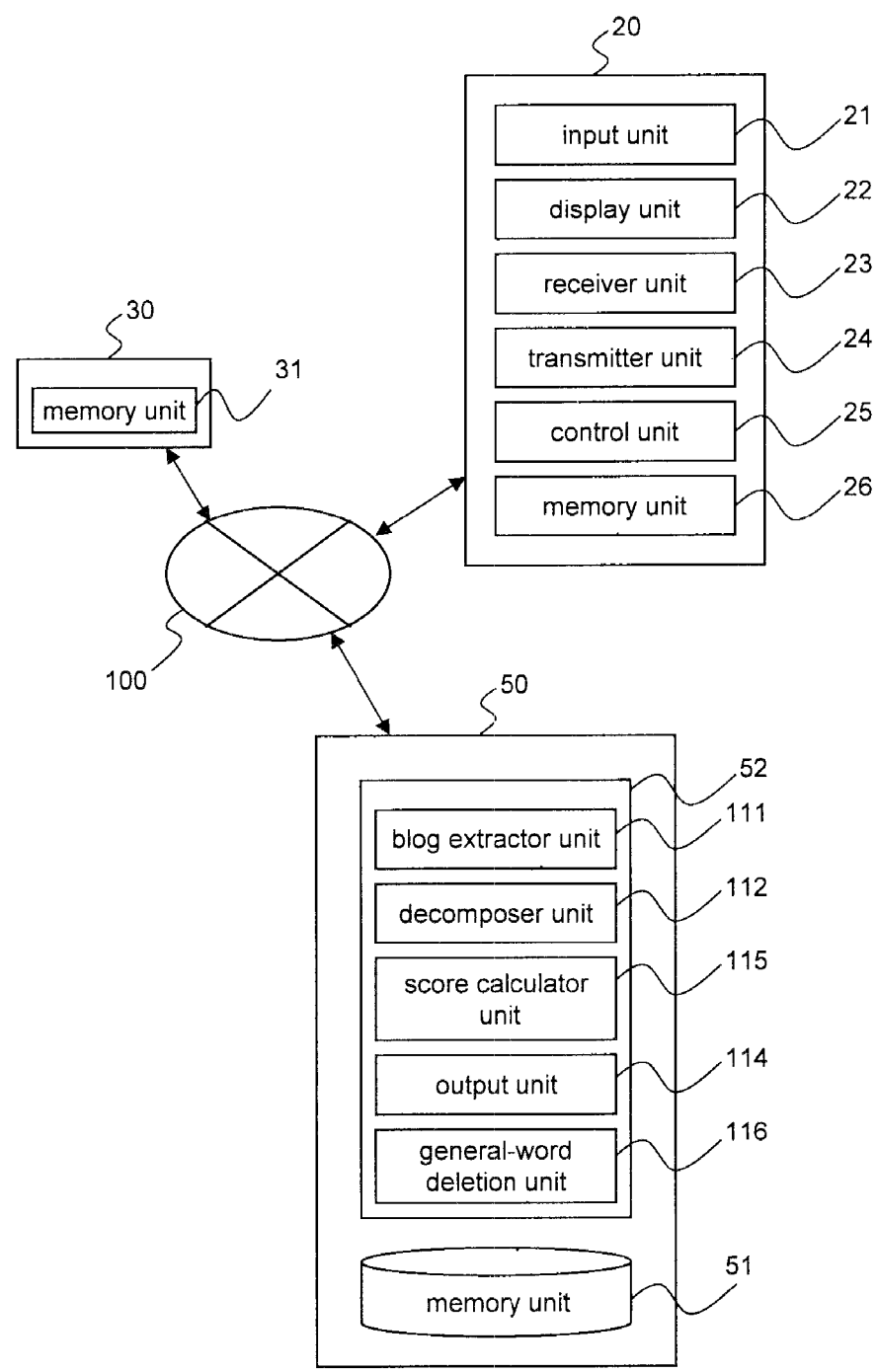
FIG. 11 is a block diagram for describing a general word extracting method according to a third exemplary embodiment.

FIG. 11 is a block diagram for describing a general-word extracting method according to this exemplary embodiment. Components similar to those of the first or second exemplary embodiment are designated the same reference numerals, and detailed descriptions thereof are omitted.

As shown in FIG. 11, general-word extraction server 50 and IPD 20 are connected through network 100. Blog server 30 which stores blogs for extracting general words is connected to network 100.

General-word extraction server 50 comprises memory unit 51 and control unit 52. Memory unit 51 has a language analysis engine previously registered thereon. Control unit 52 comprises a CPU (not shown) for executing predetermined processing in accordance with a program, and a memory (not shown) for storing the program. Control unit 52 comprises blog extractor unit 111, decomposer unit 112, score calculator unit 115, output unit 114, and general-word deletion unit 116. The CPU executes a program to virtually implement blog extractor unit 111, decomposer unit 112, score calculator unit 115, output unit 114, and general-word deletion unit 116 within general-word extraction server 50. Details of operations in each component will be described in a procedure of general-word extracting operations.

Figures 12, 13:
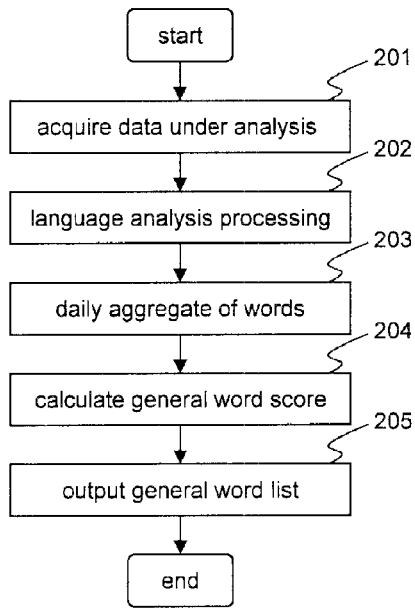
FIG. 12 is a flow chart showing an operation procedure of a general word extraction server.
FIG. 13 is a table showing an exemplary daily aggregate.

Next, a description will be given of the procedure of general-word extracting operations by general-word extraction server 50 of this exemplary embodiment. FIG. 12 is a flow chart showing an operational procedure of general-word extraction server.

When the user manipulates input unit 21 of IPD 20 to enter a period to determine blogs from which the user wishes to extract general words, control unit 25 of IPD 20 transmits a general-word extraction request signal to general-word extraction server 50. The general-word extraction request signal includes the entered period, and information which indicates that the user requests for extraction of general words. The period to determine blogs from which the user wishes to extract general words is for example, a long period in the last one to two years.

When general-word extraction server 50 receives the general-word extraction request signal from IPD 20, blog extraction unit 111 reads information on the specified period from the general-word extraction request signal, extracts blog articles that appears in the specified period from blog server 30, and stores the date (when the blog article has been contributed), article title, and article texts of each of the extracted blog articles in memory unit 51 (step 201).

Subsequently, decomposer unit 112 extracts every word from all acquired blog articles (titles and texts) using a language analysis engine. In this event, a larger weight is applied to words extracted from titles because the titles have higher importance (step 202). For example, the number of times that a word is used is increased three times. In this regard, the language analysis engine is similar to those of the first and second exemplary embodiments in analyzing described sentences to decompose them into words, each of which has the part of speech (for example, "blog"/noun and the like).

Next, score calculator unit 115 performs daily word aggregate processing for aggregating words decomposed by the language analysis processing of decomposer unit 112 on a daily basis (step 203). Then, score calculator unit 115 outputs information on the date, ranking, word, and number, combined into a set, and stores the set of information in memory unit 51. The following list shows exemplary outputs on January 1 and Jan. 2, 2008:

Date, Ranking, Word, Number
2008/1/1, First, 'blog', 500
2008/1/1, Second, 'time', 480
2008/1/2, First, 'national holiday', 600
2008/1/2, Second, 'time', 580
. . .

The above example shows that the word "blog" is used 500 times and is ranked at the top on Jan. 1, 2008 on a daily basis. On the other hand, the example shows that the word "national holiday" is used 600 times and is ranked at the top on Jan. 2, 2008 on a daily basis.

Subsequently, score calculator unit 115 calculates scores for ranked words in order to extract general words (step 204). While any one of the three methods can be used for calculating the score, the methods will be described later. There are the following two conditions for general words:

Condition 1: a word which appears in blogs with high frequency.

Condition 2: a word which is regularly utilized everyday (with small variations in frequency of everyday appearance).

Subsequently, output unit 114 creates a general word list which rearranges the words such that their scores calculated at step 204 are presented in a descending order, and registers the general word list in memory unit 51 (step 205). Equivalently, the general word list describes words which should be excluded from a search object. Output unit 114 also notifies IPD 20 of information which indicates that the general word list has been registered.

Here, three methods will be described for the general-word score calculating method.

A first method utilizes the amount of information, and the number of times a word appears. An equation for calculating a general word score for word w is expressed by:

$$\text{Score}(w) = \alpha F(w) \times (1 + \log T(w)) \times \Sigma Ht(w) \qquad \text{Equation 5}$$

where $\alpha$ is a score scaling constant, $F(w)$ represents the total number of times word w appears for an entire specified period, $T(w)$ represents the number of periods in which word w is utilized, $\Sigma Ht(w)$ is a sum total of the amount of information (degree of variations) in each period, and t is a date in the specified period.

Information entropy or the like, for example, is used for $Ht(w)$ in Equation 5. An example of $Ht(w)$ is shown below.

$$Ht(w) = -Ft(w)/F(w) \times \log(Ft(w)/F(w)) \qquad \text{Equation 6}$$

where $Ft(w)$ represents the number of times word w appears at date t.

Next, a second method will be described. The second method utilizes the amount of information and a word appearance probability. An equation for calculating a general word score for word w is expressed by:

$$\text{Score}(w) = \alpha P(w) \times (1 + \log T(w)) \times \Sigma Ht(w) \qquad \text{Equation 7}$$

where $P(w)$ represents the sum total of dairy appearance probabilities of word w for all periods ($=\Sigma Ft(w)/Ft$, t=min, min+1, . . . ), and Ft represents the sum total of the number of times of appearances for all words on date t. $T(w)$ and $\alpha$ are the same as those in the first method.

Information entropy or the like, for example, is used for $Ht(w)$ in Equation 7. An example of $Ht(w)$ is shown below.

$$Ht(w) = -Pt(w)/P(w) \times \log(Pt(w)/P(w)) \qquad \text{Equation 8}$$

where Pt(w) represents the appearance probability of word w (=Ft(t)/Ft) at date t.

Next, a third method will be described. The third method utilizes the amount of information, and ranking of words with respect to the number of times each word appears in blogs. An equation for calculating a general word score for word w is expressed by:

$$Score(w) = \alpha 0(w) \times (1 + \log T(w)) \times \Sigma Ht(w) \quad \text{Equation 9}$$

0(w) represents the sum total of the ranking points that are assigned to word w that appears each day for all periods. A word at a higher rank is given a higher point. For example, the first ranked word is given 5,000 points; second, 4999 points; . . . and so forth. T(w) and a are similar to those of the first method.

Information entropy or the like, for example, is used for Ht(w) in Equation 9. An example of Ht(w) is shown below.

$$Ht(w) = -0t(w)/0(w) \times \log(0t(w)/0(w)) \quad \text{Equation 10}$$

0t(w) in Equation 10 represents the ranking point that is assigned to word w that appears each day. A word at a higher rank is given a higher point. For example, the first ranked word is given 5,000 points; second, 4999 points; . . . and so forth.

The first method is advantageous over the second and third methods in that a smaller amount of calculations is required. The second method is advantageous over the third method in that it not only requires a smaller amount of calculations but also is not affected by variations in the daily total number (the number of all blogs).

The third method is not only affected by variations in the daily total number (the number of all blogs) but also can more accurately extract regularly used words than the first and second methods. In other words, the third method does not extract such words that suddenly appear in an increased number of blogs for a certain period but can accurately extract those words which are constantly written in blogs. A "word which suddenly increases for a certain period" refers to, for example, the title of a sport event such as World Cup Football, Olympics and the like, the name of an actor (actress) who takes part in a movie that is showing or a drama that gains a high audience rating.

Next, a description will be given of the general word list created by general-word extraction server 50 of this exemplary embodiment when it is applied to the information search method described in the first or second exemplary embodiment. In this regard, since a similar description will be made when the general word list is applied to either the first exemplary embodiment (words C) or the second exemplary embodiment (words B, words D), the following description will be given of a scenario where the general word list is used in the first exemplary embodiment (words C).

Search server 10 shown in FIG. 1 extracts words C at step 108 in the first exemplary embodiment, and then transmits general word analysis request information to general-word extraction server 50. The general word analysis request information includes search word confirmation screen data and information which indicates that a request is made to analyze words C for general words.

Upon receipt of the general word analysis request information from search server 10, general-word deletion unit 116 of general-word extraction server 50 matches words in the search word confirmation screen data with the general word list. As a result of the matching, a weighting that is assigned words comparable to general words is reduced according to one of the following two methods.

(1) The score (the number of times a word is used, or the number of blogs which uses the word) in the search word confirmation screen data is multiplied by the inverse of a general word score (1/general word score) to place a general word at a lower rank on the search word confirmation screen. The general word score presents a higher value at a higher general word rank.

(2) A word which matches a general word through the matching is completely prevented from being displayed on the search word confirmation screen.

Additionally, the user may instruct IPD 20 to transmit the general word analysis request information to general-word extraction server 50. In this event, the general word analysis request information includes a word list and information which indicates that a request is made to analyze words C for general words. Also, the user may specify from IPD 20 how to output blog data.

As another method that is different from the foregoing one, search server 10 may access the general word list in memory unit 51 of general-word extraction server 50, after words C have been extracted at step 108, in the first exemplary embodiment, and may reduce the score (the number of times a word is used, or the number of blogs which use the word) of words C presented on the general word list.

This exemplary embodiment can be used for a list of extracted/collected words, such as notation wobbling words, pertinent word candidates, suddenly frequently used words, highly frequently used words, and the like, and is not limited to words C, and more pertinent words are displayed at higher ranks by removing general words from extracted words listed at higher ranks, thus allowing the user to access information intended for retrieval at an earlier stage.

Also, even if the user did not previously create the general word list, unnecessary words are excluded from the result of extraction/collection by use of the general word list, when information is extracted/collected, thus leading to a higher readability for the result of an analysis on extracted/collected words. Further, since display disabled (NG) words are automatically picked up, thus the user is burdened with less effort for creating a list of NG words. Moreover, general words can be collected in a more exhaustive manner.

While the foregoing description has been given of a scenario where general words are extracted in batch processing, they may be automatically extracted. In the following, a brief description will be given of the operation in automatic general word extraction.

The general word extraction processing is set to be automatically executed by a timer once a day, for example, at every midnight.

Blog extraction unit 111 acquires newly added blog data. The data includes the date (on which each blog article is contributed), article title, and article texts. Blog extraction unit 111 also reads statistics on the amount of words which have been stored in the past, from memory unit 51. In this way, blog extraction unit 111 acquires information on date, word, and frequency (at least one of the number of blogs, ranking, probability). Score calculator unit 115 performs language analysis processing at step 202 and daily word aggregate processing at step 203 to calculate statistics on the amount of words for recent blogs. Subsequently, score calculator unit 115 performs the general word score calculation processing at step 204, and registers the general word list created by output unit 114 in memory unit 51.

In this exemplary embodiment, general-word extraction server 50 is provided separately from search server 10, but alternatively, search server 10 may be provided with the functions of general-word extraction server 50.

A period of aggregating words for extracting general words is equivalent to a first predetermined period of the present invention. Also, while the foregoing exemplary embodiment has been described on the assumption that a "second predetermined period" of the present invention is a "day" for simplifying the description, the second predetermined period is not limited to a day but may be any period shorter than the first predetermined period such as a week, a month and the like. In the following example described below, the second predetermined period is also assumed to be a "day" for simplifying the description.

Further, in the foregoing exemplary embodiment described above, candidate words for general words are chosen to be nouns for simplifying the description, but the words are not limited to nouns but may include verbs and adjectives. In the following example, candidate words for general words may be any part of speech such as noun, verb, adjective and the like.

Example 2

This example shows other examples of the first through third general word score calculating methods, respectively, described in the third exemplary embodiment.

FIG. 13 is a table showing an exemplary daily aggregate. FIG. 13 shows daily results on Jan. 1, 2008 and Jan. 2, 2008. FIG. 14 is a table showing an exemplary total aggregate for a certain period. FIG. 14 shows the result of a total aggregate in a period from Jan. 1, 2008 to X month, X day, 200X.

Referring to FIGS. 13 and 14, a description will be given of the first method which utilizes an information amount and the number of times each word appears.

(First Method)

Selected herein are those words which are ranked at higher positions with respect to the total number of articles (equal to or larger than a predefined number) and whose daily aggregated number varies less (variations within a prescribed number).

For example, words which appear in 2,000 articles or more are extracted. Words a, b, c, d, . . . are extracted from FIG. 14.

Among these words, word a and word c represent the daily number of words that appear at a certain frequency which relatively changes within ±50. In this case, it is assumed that articles in which word b appears is less than 430 on January 2, and that articles in which word d appears is less than 400 on January 2. It is also assumed that other words which represent the total number of articles equal to or larger than 2,000, except for words a, b, c, and d, vary beyond the prescribed number, similarly to words b and d. Accordingly, word a and word c are selected as general words.

It should be noted that the variations within a prescribed number of articles refer to the difference in the number of articles that appeared the previous day or the difference between the maximum and the minimum concerning the daily number of the word within the period. This definition applies to a second and a third method as well.

(Second Method)

Next, a description will be given of a second method which utilizes the amount of information and word appearance probability. A daily probability is the probability of a word that appeared each day.

Selected herein are those words which are ranked at higher positions with respect to the total sum of daily probability (equal to or larger than a predefined value) and which vary less in the probability of daily aggregate (variations within a prescribed value).

For example, words which represent the total sum of daily probability equal to or larger than a predefined value of 0.04% are extracted. Words a, b, c, d, . . . are extracted from FIG. 14.

Among these words, word a and word c represent the daily probability which relatively changes within ±0.003%. In this case, it is assumed that the probability of word b is equal to or less than 0.0061 on January 2, and the probability of word d is equal to or less than 0.0055 on January 2. It is also assumed that other words which represent the sum total equal to or larger than the predefined value of 0.04%, except for words a, b, c, d, vary beyond the prescribed value, similarly to words b and d. Accordingly, word a and word c are selected as general words.

(Third Method)

Next, a description will be given of a third method which utilizes the amount of information and the ranking of words that appears.

Selected herein are those words which are ranked at higher positions with respect to the total sum of ranking points (equal to or larger than a predefined value) and which vary less in the ranking point of daily aggregate (variations within a prescribed value).

For example, words which represent the total sum of ranking point at the ten highest ranks (or equal to or larger than a predefined value of 25,000) are extracted. Words a, b, c, d, . . . are extracted from FIG. 14.

Among these words, word a and word c represent the daily ranking point which relatively changes within ±8 (at or higher than the eighth rank). It is assumed that the ranking point of word b is equal to or less than 4990 (at or lower than the eleventh rank) on January 2, and the ranking point of word d is equal to or less than 4988 (at or lower than the thirteenth rank) on January 2. It is also assumed that other words which represent the sum total at or higher than the tenth rank, except for words a, b, c, d, vary beyond the prescribed value, similarly to words b and d. Accordingly, word a and word c are selected as general words.

Example 3

Example 2 extracts general words from all blogs which can be accessed on the network, whereas this example extracts general words from texts associated with an individual user or a group of persons who are interested in the same hobby. This example can be utilized to analyze the profile on an individual basis or in units of groups.

Since Example 3 is similar to the respective exemplary embodiments and examples described in the above configuration and operation except that texts found in blogs in a predetermined range are subjected to the analysis instead of all blogs, a detailed description thereof is omitted.

While the foregoing exemplary embodiments and examples have been described in connection with blogs, any text can be subjected to the analysis, without any limitation on blogs, as long as it is an accessible text, including information such as home pages, electronic mails, document files and the like which may be stored in a server or an information processing device, open or not open to the network, or transmitted to members. The storage unit of the present invention may be memory unit 26 of IPD 20. Additionally, there may be a plurality of blog servers 30, not limited to one, when blogs are subjected to the analysis as well.

The present invention can be applied to a system which is intended to confirm/analyze the world's opinion on blogs and the like about goods, service and the like associated with an entered keyword.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A server device comprising:
  a control unit collecting texts stored in a storage unit in response to a general word extracting request signal input by a user or when a predetermined time is reached, extracting words from said collected texts, determining, as a general word, a word which appears at a frequency higher than a first predefined value for a first predetermined period, and which appears at a frequency varying within a second predefined value range for every second predetermined period shorter than said first predetermined period, and creating a general word list which enumerates a plurality of general words including said general word,
  wherein said control unit, when a keyword for a search is entered, collects texts including said keyword from texts stored in said storage unit, extracts nouns from collected first texts, determines a noun which partially matches said keyword as a first word, extracts second texts including said first word from among said first texts, extracts a word which belongs to at least one word from among a noun, verb, and adjective from said second texts, counts a number of times said extracted word is used, determines words which are ranked at a predetermined position or higher with respect to the number of times said words are used, as second words which are pertinent word to said first word, lowers the rank of a second word which matches any one from among said plurality of general words in said general word list, and outputs said second words together with said first word.

2. A server device comprising:
  a control unit collecting texts stored in a storage unit in response to a general word extracting request signal input by a user or when a predetermined time is reached, extracting a plurality of words from said collected texts, calculating a score for each of said plurality of words based on an appearance frequency for a first predetermined period and an appearance frequency for every second predetermined period shorter than said first predetermined period, and creating a general word list which includes said plurality of words and said scores,
  wherein said control unit, when a keyword for a search is entered, collects texts including said keyword from texts stored in said storage unit, extracts nouns from collected first texts, determines a noun which partially matches said keyword as a first word, extracts second texts including said first word from among said first texts, extracts a word which belongs to at least one word from among a noun, verb, and adjective from said second texts, counts number of times said extracted word is used, determines words which are ranked at a predetermined position or higher with respect to the number of times said words are used, as second words which are pertinent word to said first word, lowers the rank of a second word which matches any one from among said plurality of words in said general word list, and outputs said second words together with said first word.

3. The server device according to claim 1, wherein said every second predetermined period is daily, weekly, or monthly.

4. The server device according to claim 2, wherein said every second predetermined period is daily, weekly, or monthly.

5. The server device according to claim 1, wherein said appearance frequency for said first predetermined period is of one type of category comprising a number of articles in which said word appears for the period, or a proportion of the number of articles in which said word appears, or a ranking of number of articles in which said word appears, and said appearance frequency for said second predetermined period is the number of articles in which said word appears for the period, or a proportion of the number of articles in which said word appears, or a ranking of the number of articles in which said word appears in correspondence to said category of said appearance frequency for said first predetermined period.

6. The server device according to claim 2, wherein said appearance frequency for said first predetermined period is of one type of category comprising a number of articles in which said word appears for the period, or a proportion of the number of articles in which said word appears, or a ranking of number of articles in which said word appears, and said appearance frequency for said second predetermined period is the number of articles in which said word appears for the period, or a proportion of the number of articles in which said word appears, or a ranking of the number of articles in which said word appears in correspondence to said category of said appearance frequency for said first predetermined period.

7. A server device comprising:
  a control unit collecting texts stored in a storage unit in response to a general word extracting request signal input by a user or when a predetermined time is reached, extracting words from said collected texts, determining, as a general word, a word which appears at a frequency higher than a first predefined value for a first predetermined period, and which appears at a frequency varying within a second predefined value range for every second predetermined period shorter than said first predetermined period, and creating a general word list which enumerates a plurality of general words including said general word,
  wherein said control unit, when a keyword for a search is entered, collects texts including said keyword from texts stored in said storage unit, extracts nouns from collected first texts, determines a noun which partially matches said keyword as a first word, extracts second texts including said first word from among said first texts, extracts a word which belongs to at least one word from among a noun, verb, and adjective from said second texts, counts a number of times said extracted word is used, determines words which are ranked at a predetermined position or higher with respect to the number of times said words are used, as second words which are pertinent word to said first word, deletes a second word which matches any one from among said plurality of general words in said general word list, and outputs remained second words together with said first word.

8. A server device comprising:
  a control unit collecting texts stored in a storage unit in response to a general word extracting request signal input by a user or when a predetermined time is reached, extracting a plurality of words from said collected texts, calculating a score for each of said plurality of words based on an appearance frequency for a first predetermined period and an appearance frequency for every second predetermined period shorter than said first predetermined period, and creating a general word list which includes said plurality of words and said scores, wherein said control unit, when a keyword for a search is entered, collects texts including said keyword from texts stored in said storage unit, extracts nouns from collected first texts, determines a noun which partially matches said keyword as a first word, extracts second texts including said first word from among said first texts, extracts a word which belongs to at least one word from among a noun, verb, and adjective from said second texts, counts a number of times said extracted word is used, determines words which are ranked at a predetermined position or higher with respect to the number of times said words are used, as second words which are pertinent word to said first word, deletes a second word which matches any one from among said plurality of words in said general word list, and outputs remained second words together with said first word.

9. An information processing method comprising:

collecting texts stored in a storage unit in response to a general word extracting request signal input by a user or when a predetermined time is reached, and extracting words from said collected texts;

determining, as a general word, a word which appears at a frequency higher than a first predefined value for a first predetermined period, and which appears at a frequency varying within a second predefined value range for every second predetermined period shorter than said first predetermined period;

creating a general word list which enumerates a plurality of general words including said general word;

collecting texts including a keyword from texts stored in said storage unit in response to said keyword entered for a search;

extracting nouns from collected first texts, determining a noun which partially matches said keyword as a first word;

extracting second texts including said first word from among said first texts;

extracting a word which belongs to at least one word from among a noun, verb, and adjective from said second texts;

counting a number of times said word extracted from said second texts is used;

determining words extracted from said second texts, as second words which are pertinent word to said first word, if the words are ranked at a predetermined position or higher with respect to the number of times the words are used; and lowering the rank of a second word which matches any one from among said plurality of general words in said general word list, and outputting said second words together with said first word.

10. An information processing method comprising:

collecting texts stored in a storage unit in response to a general word extracting request signal input by a user or when a predetermined time is reached, and extracting a plurality of words from said collected texts;

calculating a score for each of said plurality of words based on an appearance frequency for a first predetermined period and an appearance frequency for every second predetermined period shorter than said first predetermined period;

creating a general word list which includes said plurality of words and said scores;

collecting texts including a keyword from texts stored in said storage unit in response to said keyword entered for a search;

extracting nouns from collected first texts, determining a noun which partially matches said keyword as a first word;

extracting second texts including said first word from among said first texts;

extracting a word which belongs to at least one word from among a noun, verb, and adjective from said second texts;

counting a number of times said word extracted from said second texts is used;

determining words extracted from said second texts, as second words which are pertinent word to said first word, if the words are ranked at a predetermined position or higher with respect to the number of times the words are used; and lowering the rank of a second word which matches any one from among said plurality of words in said general word list, and outputting said second words together with said first word.

11. The information processing method according to claim 9, wherein said every second predetermined period is daily, weekly, or monthly.

12. The information processing method according to claim 10, wherein said every second predetermined period is daily, weekly, or monthly.

13. The information processing method according to claim 9, wherein said appearance frequency for the first predetermined period is of one type of category comprising a number of articles in which said word appears for the period, or a proportion of the number of articles in which said word appears, or a ranking of the number of articles in which said word appears, and said appearance frequency for said second predetermined period is the number of articles in which said word appears for the period, or a proportion of the number of articles in which said word appears, or a ranking of the number of articles in which said word appears in correspondence to said category of said appearance frequency for said first predetermined period.

14. The information processing method according to claim 10, wherein said appearance frequency for the first predetermined period is of one type of category comprising a number of articles in which said word appears for the period, or a proportion of the number of articles in which said word appears, or a ranking of the number of articles in which said word appears, and said appearance frequency for said second predetermined period is the number of articles in which said word appears for the period, or a proportion of the number of articles in which said word appears, or a ranking of the number of articles in which said word appears in correspondence to said category of said appearance frequency for said first predetermined period.

15. An information processing method comprising:

collecting texts stored in a storage unit in response to a general word extracting request signal input by a user or when a predetermined time is reached, extracting words from said collected texts;

determining, as a general word, a word which appears at a frequency higher than a first predefined value for a first predetermined period, and which appears at a frequency varying within a second predefined value range for every second predetermined period shorter than said first predetermined period;

creating a general word list which enumerates a plurality of general words including said general word;

collecting texts including a keyword from texts stored in said storage unit in response to said keyword entered for a search;

extracting nouns from collected first texts;
determining a noun which partially matches said keyword as a first word;
extracting second texts including said first word from among said first texts;
extracting a word which belongs to at least one word from among a noun, verb, and adjective from said second texts;
counting a number of times said word extracted from said second texts is used;
determining words extracted from said second texts, as second words which are pertinent word to said first word, if the words are ranked at a predetermined position or higher with respect to the number of times the words are used; and
deleting a second word which matches any one from among said plurality of general words in said general word list, and outputting remained second words together with said first word.

16. An information processing method comprising:
collecting texts stored in a storage unit in response to a general word extracting request signal input by a user or when a predetermined time is reached, and extracting a plurality of words from said collected texts;
calculating a score for each of said plurality of words based on an appearance frequency for a first predetermined period and an appearance frequency for every second predetermined period shorter than said first predetermined period;
creating a general word list which includes said plurality of words and said scores;
collecting texts including a keyword from texts stored in said storage unit in response to said keyword entered for a search;
extracting nouns from collected first texts;
determining a noun which partially matches said keyword as a first word;
extracting second texts including said first word from among said first texts;
extracting a word which belongs to at least one word from among a noun, verb, and adjective from said second texts;
counting a number of times said word extracted from second texts is used;
determining words extracted from said second texts, as second words which are pertinent word to said first word, if the words are ranked at a predetermined position or higher with respect to the number of times the words are used; and
deleting a second word which matches any one from among said plurality of words in said general word list, and outputting remained second words together with said first word.

* * * * *

UNITED STATES PATENT AND TRADEMARK OFFICE
CERTIFICATE OF CORRECTION

PATENT NO. : 8,838,616 B2
APPLICATION NO. : 12/543263
DATED : September 16, 2014
INVENTOR(S) : Norikazu Matsumura It is certified that error appears in the above-identified patent and that said Letters Patent is hereby corrected as shown below:

In the Specification,
Column 13, Line 15: Delete "a" and insert -- $\alpha$ --

Signed and Sealed this
Twenty-fourth Day of February, 2015

Michelle K. Lee
*Deputy Director of the United States Patent and Trademark Office*